United States Patent [19]
Schubert

[11] 3,869,353
[45] Mar. 4, 1975

[54] PROCESS FOR REGENERATING CONTAMINATED PERCHLORCETHYLENE

[75] Inventor: Ernst Schubert, Gunzburg, Danube, Germany

[73] Assignee: Chemische Fabrik Richard Geiss, Danube, Lusshof, Germany

[22] Filed: Dec. 10, 1973

[21] Appl. No.: 423,502

[30] Foreign Application Priority Data
Feb. 28, 1973 Germany............................ 2309997

[52] U.S. Cl. ........................ 203/38, 203/57, 203/60, 260/652 P, 260/654 S
[51] Int. Cl. .......................... B01d 3/34, C07c 21/04
[58] Field of Search ........ 260/652 P, 654 S; 203/38, 203/57, 60, 6, 8

[56] References Cited
UNITED STATES PATENTS

| | | | |
|---|---|---|---|
| 2,000,881 | 5/1935 | Coleman ........................ | 260/652 P |
| 2,106,158 | 1/1938 | Povenz et al. .................... | 260/654 S |
| 2,120,668 | 6/1938 | Hanson ............................ | 260/654 S |
| 2,280,794 | 4/1942 | Cass ................................. | 260/654 S |
| 3,209,040 | 9/1965 | Daras et al. ..................... | 260/654 S |
| 3,452,110 | 6/1969 | Cooley et al. ................... | 260/654 S |

*Primary Examiner*—Wilbur L. Bascomb, Jr.
*Attorney, Agent, or Firm*—Littlepage, Quaintance, Murphy & Dobyns

[57] ABSTRACT

Impurified perchloroethylene is regenerated by distilling it in the presence of about 0.01 to 1.0 percent of a peroxygen compound which decomposes at a temperature between 30° and 120°C, boils together with its by-products at a temperature above 121°C, but which does not form an azeotropic distillate with perchloroethylene.

9 Claims, No Drawings

PROCESS FOR REGENERATING CONTAMINATED PERCHLORCETHYLENE

FIELD OF THE INVENTION

This invention relates to a process for regenerating contaminated perchloroethylene (tetrachloroethylene or tetrachloroethlene $Cl_2C : CCl_2$).

BACKGROUND OF THE INVENTION

Perchloroethylene is used frequently as a solvent, extraction agent and degreasing agent. Above all, however, perchloroethylene is the most important solvent for the chemical cleaning of textiles. Perchloroethylene which has been used in chemical cleaning operations is contaminated, or impurified, and contains varying amounts of different impurities (oils and greases, tar and resin residues, coloring and odor-imparting ingredients, etc.) and also a certain amount of water. Also, recently there have been added to the cleaning fluids so-called washing-active or boundary or surface-active (surfactant) agents (cleaning strengtheners, detergents, wetting agents, dry cleaning soaps) as well as bacteriocides (disinfectants). Heretofore after filtration through standard filters or layers of adsorption agents, the perchloroethylene is separated from the impurified cleaning fluid by distillation in a simple distillation vessel or column and is thus purified for re-use. Impurities remain in the sump of the vessel or in the column.

The so-called filter residues which occur in chemical cleaning processes consist of the adsorption agent, such as Kieselguhr (diatomaceous or bleaching earth) with an average amount of about 30 percent of perchloroethylene adsorbed therein, and these residues have in the past usually been dumped in suitable places as waste products without any use; now, however, with a view to protecting the environment, they must also be treated. For this purpose, the filter residues have heretofore been subjected to a steam distillation process and the crude perchloroethylene which is distilled off is then also subjected to a column distillation process The perchloroethylene distilled over does indeed have the same physical constants as perchloroethylene which has never been used, however it usually has a very unpleasant smell which greatly limits its reuse, for example as a chemical cleaning agent, because this smell clings to the textiles which are to be cleaned. For many years attempts have been made in vain to eliminate this smell by a. improving the general working conditions,
b. development of improved distilling plants,
c. distilling in the presence of an aqueous oxidizing agent, such as potassium permanganate,
d. using adsorption agents, such as activated carbon and kieselguhr,
e. washing the distillate with water, etc.

For instance, the following treatments of 1 kg of contaminated perchloroethylene in each instance was found to be completely negative:

distillation after dissolving 10 g $KMnO_4$ in the presence of water;
distillation in the presence of 100 g adsorbent,
filtering the distillate through 100 g adsorbent,
stirring for 2 hours with 100 g adsorbent.

OBJECT OF THE INVENTION

An object of the present invention is to provide an improved process for treating contaminated perchloroethylene which does not impair the distillation operation used up until now and which results in perchloroethylene differing as little as possible, especially from the point of view of its smell, from unused perchloroethylene, so that it can be used again for any purpose.

DESCRIPTION OF THE INVENTION

According to the present invention, there is provided a process for regenerating contaminated perchloroethylene, comprising the step of subjecting the contaminated perchloroethylene to a distillation operation after the addition of about 0.01 to 1.0 percent, preferably 0.3 to 0.7 percent, of an organic per-compound which is soluble in perchloroethylene, which does not cause decomposition of the perchloroethylene under distilling conditions, which has a decomposition temperature of between 30° and 120°C, which boils, together with its by-products, at over 121°C, and which does not distill over in an azeotropic manner with perchloroethylene.

Perchloroethylene can be obtained as a product of this process having little or no odor, any odor being pleasant or even refreshing, without the physical properties of the perchloroethylene differing from pure perchloroethylene because the decomposition products of the per-compound remain in the sump of the column and do not therefore have any effect on the distillate.

Suitable organic per-compounds meeting the above criteria are advantageously acyl peroxides or peroxycarbonates, especially those having 8 to 18 carbon atoms in an aliphatic acyl chain, or benzoyl peroxide.

The following are examples of the organic per-compounds which can be used in the process of the present invention:

1. Acyl peroxides, such as decanoyl peroxide (caprinoyl peroxide), lauroyl peroxide and benzoyl peroxide;
2. Acyl peroxycarbonate, such as stearyl peroxycarbonate and myristyl peroxycarbonate.

These and other organic per-compounds become decomposed below 120°C in the final state of the distillation process to harmless by-products which remain in the sump of the column.

The invention will be further described in the following examples:

EXAMPLE 1

1.4 kg lauroyl peroxide is dissolved in 1,600 kg contaminated perchloroethylene and the mixture is distilled in a packed column at 125° to 135°C at normal pressure. The distillate which is obtained is completely free from any unpleasant foreign odor and is the same both physically and chemically as unused perchloroethylene.

EXAMPLE 2

400 kg used and impurified perchloroethylene are mixed thoroughly with 350 g stearyl peroxycarbonate and the mixture is distilled as described in Example 1. Like results were obtained.

EXAMPLE 3

1,050 g caprinoyl peroxide are dissolved in 1,200 kg contaminated perchloroethylene and the mixture is then treated in accordance with Example 1. Like results were obtained.

EXAMPLE 4

In the chemical purification of used perchloroethylene, 0.5 weight percent benzoyl peroxide is mixed with the perchloroethylene and the mixture is processed in the manner described in Example 1. Like results were obtained.

EXAMPLE 5

1.5 kg myristyl peroxycarbonate was dissolved in 2,000 kg contaminated perchloroethylene and the mixture was distilled in accordance with Example 1. Like results were obtained.

That which is claimed is:

1. A process for regenerating contaminated perchloroethylene, comprising the step of subjecting the contaminated perchloroethylene to a distillation operation to form a perchloroethylene distillate after the addition of about 0.01 to 1.0 percent of an organic peroxygen compound which is readily soluble in perchloroethylene and does not cause decomposition of the perchloroethylene under distilling conditions; said organic peroxygen compound decomposing at a temperature of between 30° and 120°C, and boiling together with its by-products at a temperature above 121°C and not forming an azeotropic distillate with perchloroethylene.

2. A process as claimed in claim 1, wherein 0.3 to 0.7 percent of the organic peroxygen compound is employed.

3. A process as claimed in claim 1, wherein an acyl peroxide with 8 to 18 C atoms in the acyl group is used as the peroxygen compound.

4. A process as claimed in claim 1, wherein an acyl-peroxycarbonate with 8 to 18 C atoms in the aliphatic acyl chain is used as the peroxygen compound.

5. A process as claimed in claim 1, wherein the peroxygen compound is benzoyl peroxide.

6. A process as claimed in claim 1, wherein the peroxygen compound is lauroyl peroxide.

7. A process as claimed in claim 1, wherein the peroxygen compound is stearyl peroxycarbonate.

8. A process as claimed in claim 1, wherein the peroxygen compound is caprinoyl peroxide.

9. A process as claimed in claim 1, wherein the peroxygen compound is myristyl peroxycarbonate.

* * * * *